United States Patent
Peck et al.

[15] 3,685,377
[45] Aug. 22, 1972

[54] MACHINE FOR CUTTING CONTOUR

[72] Inventors: Merrill V. Peck, Belmont; Edwin P. Thompson, Comstock Park; William F. Thompson, Rockford; Robert M. Peck, Sparta, all of Mich.

[73] Assignee: Frank Edge Saw Manufacturing Company, Grand Rapids, Mich.

[22] Filed: Feb. 3, 1971

[21] Appl. No.: 112,340

[52] U.S. Cl. ..................83/210, 143/26 B, 83/410
[51] Int. Cl. ..........................B26d 1/46, B27b 13/04
[58] Field of Search......83/201, 201.04, 201.07, 176, 83/410; 143/26 B, 26 R

[56] References Cited

UNITED STATES PATENTS

| | | | |
|---|---|---|---|
| 860,486 | 7/1907 | King | 143/26 R |
| 2,691,206 | 10/1954 | Kautz | 143/19 R X |
| 2,803,239 | 8/1957 | D'Avaucourt | 143/26 R |
| 3,434,439 | 3/1969 | Winberg | 83/410 X |

*Primary Examiner*—Donald R. Schran
*Attorney*—Glenn B. Morse

[57] ABSTRACT

A machine for cutting contour on a workpiece supported by a table mounted for movement to bring the work piece into engagement with a cutting member. The table is tilted on a carrier by a cam system as a function of the lateral position of the carrier along a guideway, with the movement of the carrier preferably coordinated with the movement of the cutting element.

9 Claims, 10 Drawing Figures

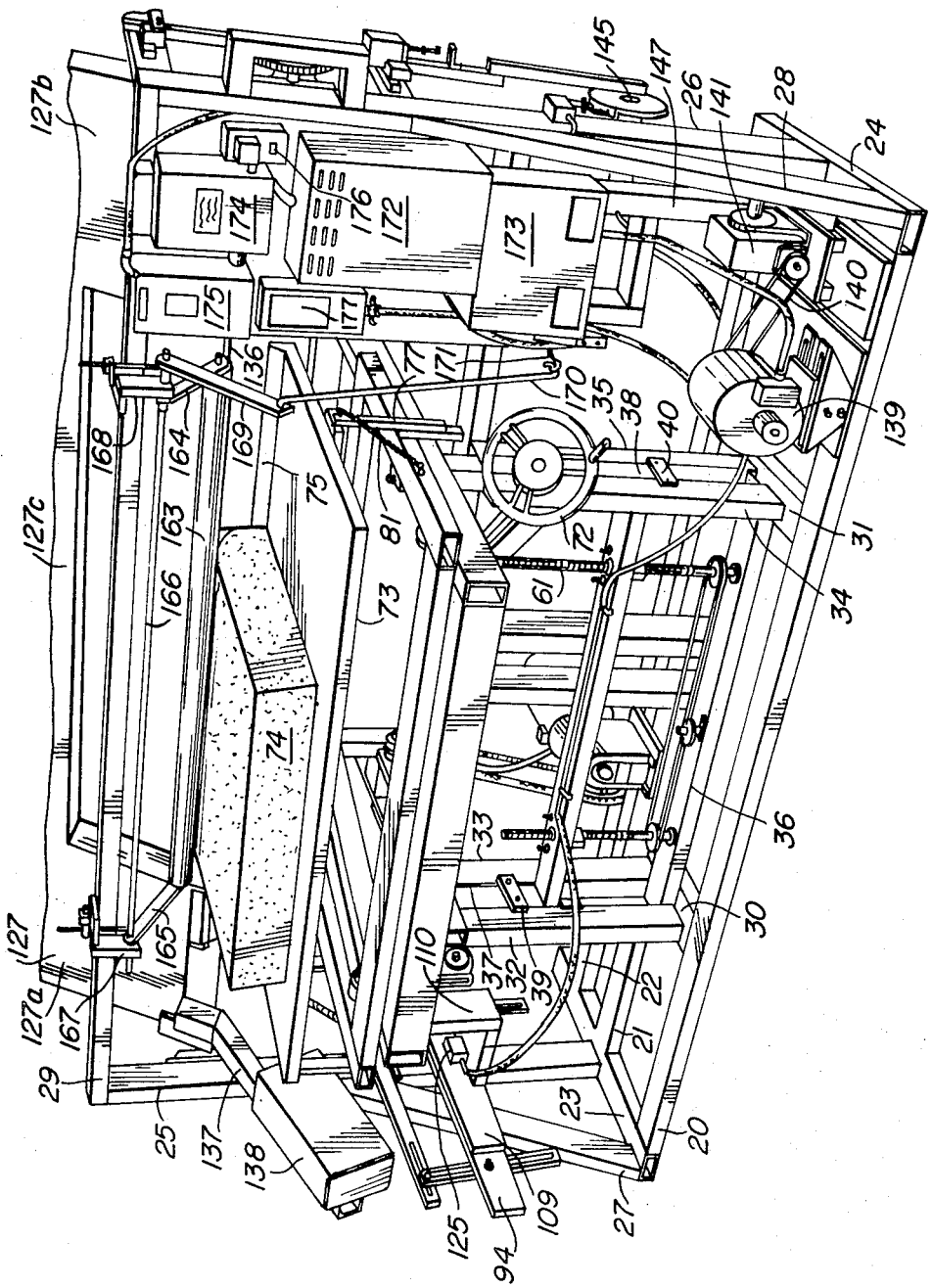
INVENTORS:
MERRILL V. PECK
EDWIN P. THOMPSON
ROBERT M. PECK
WM. F. THOMPSON

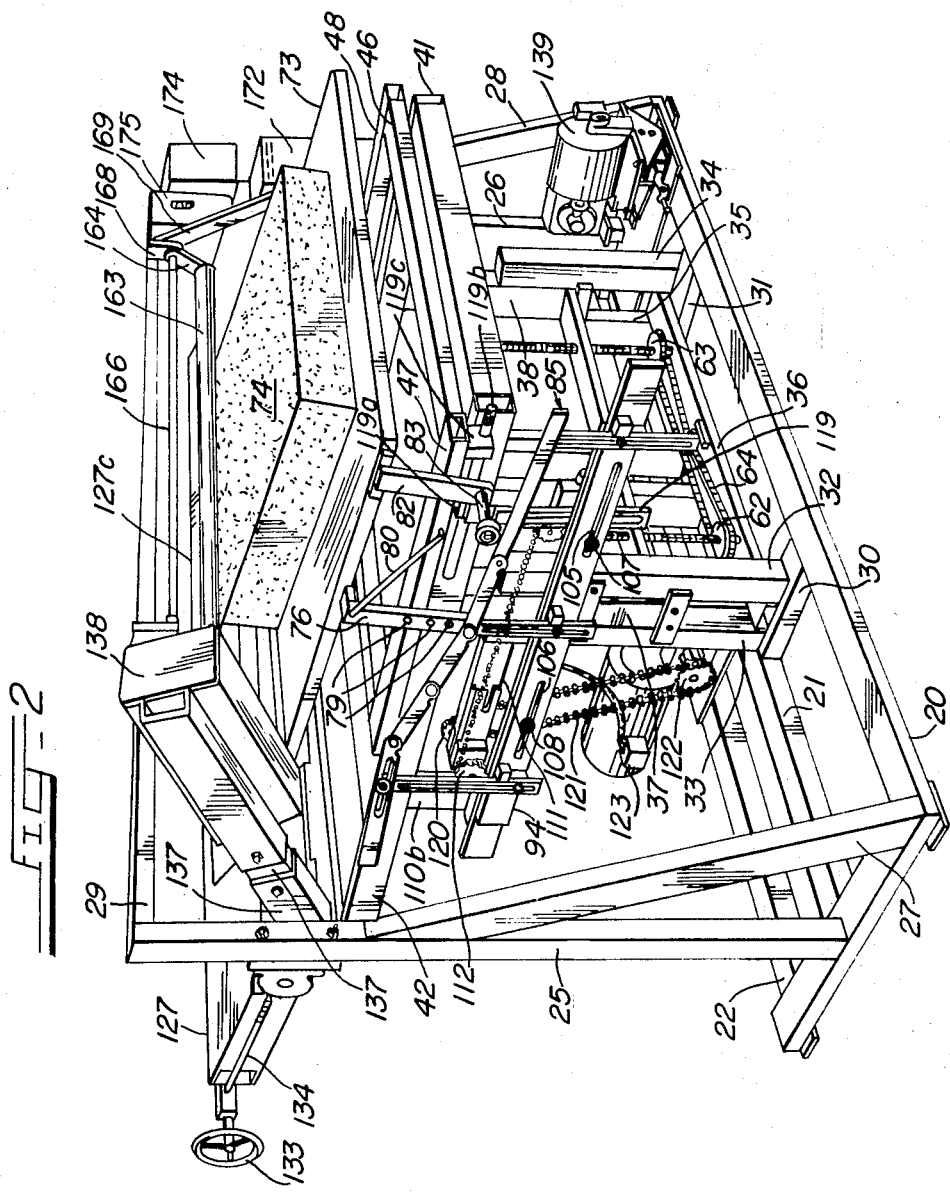

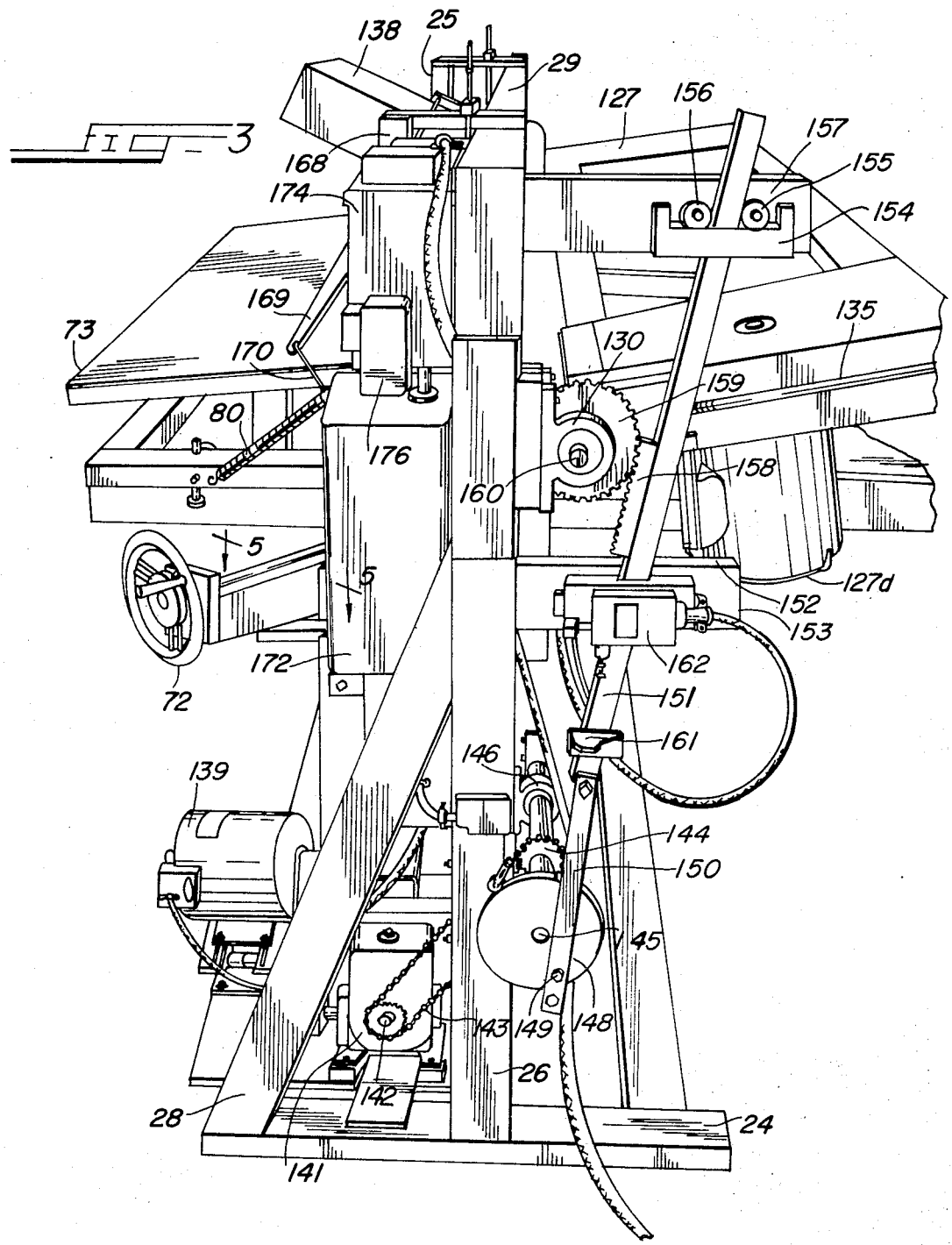

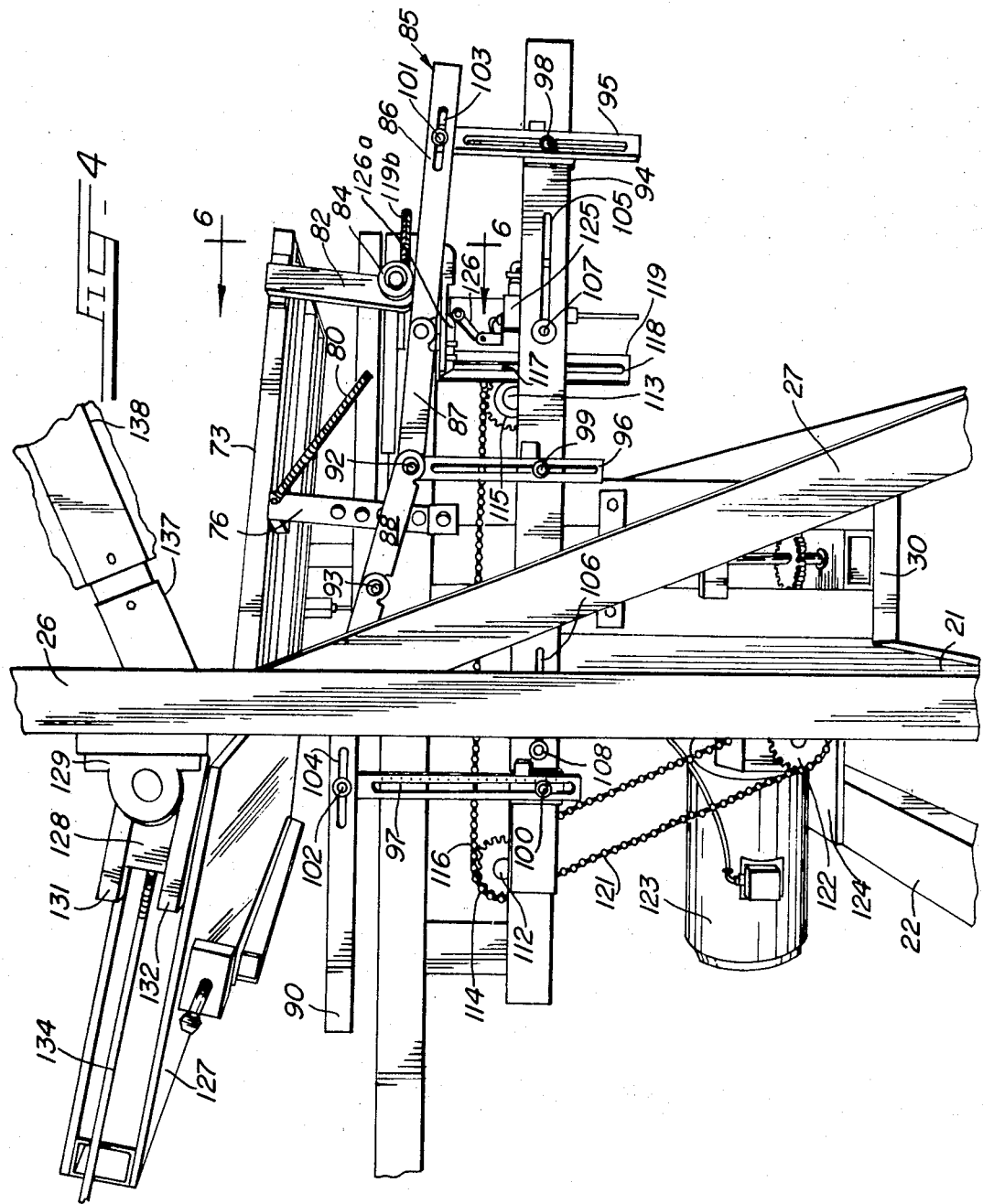

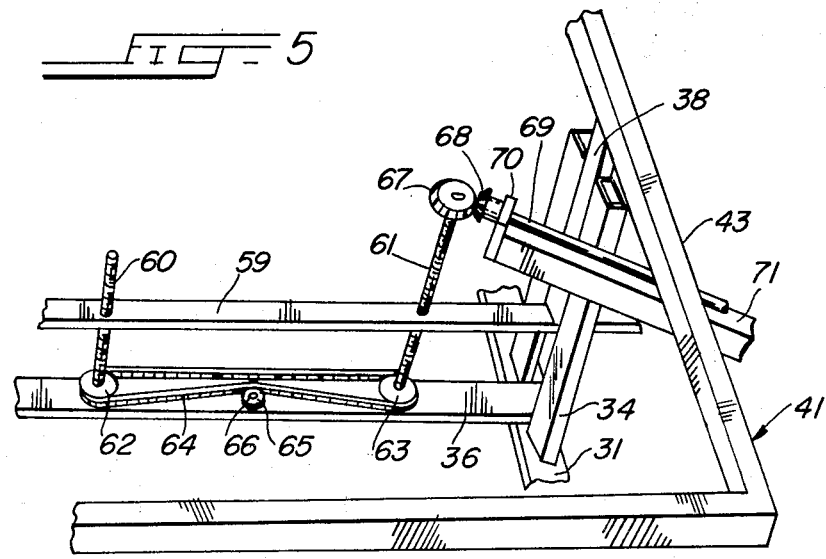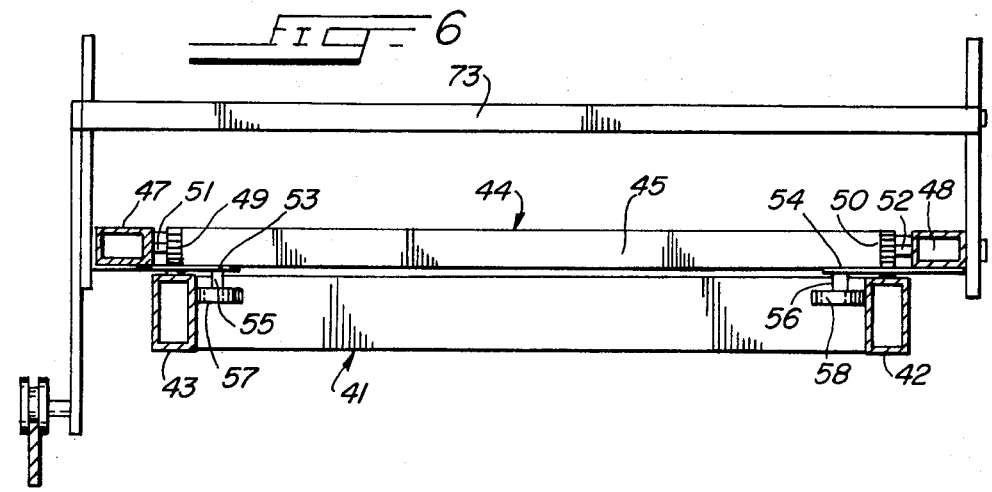

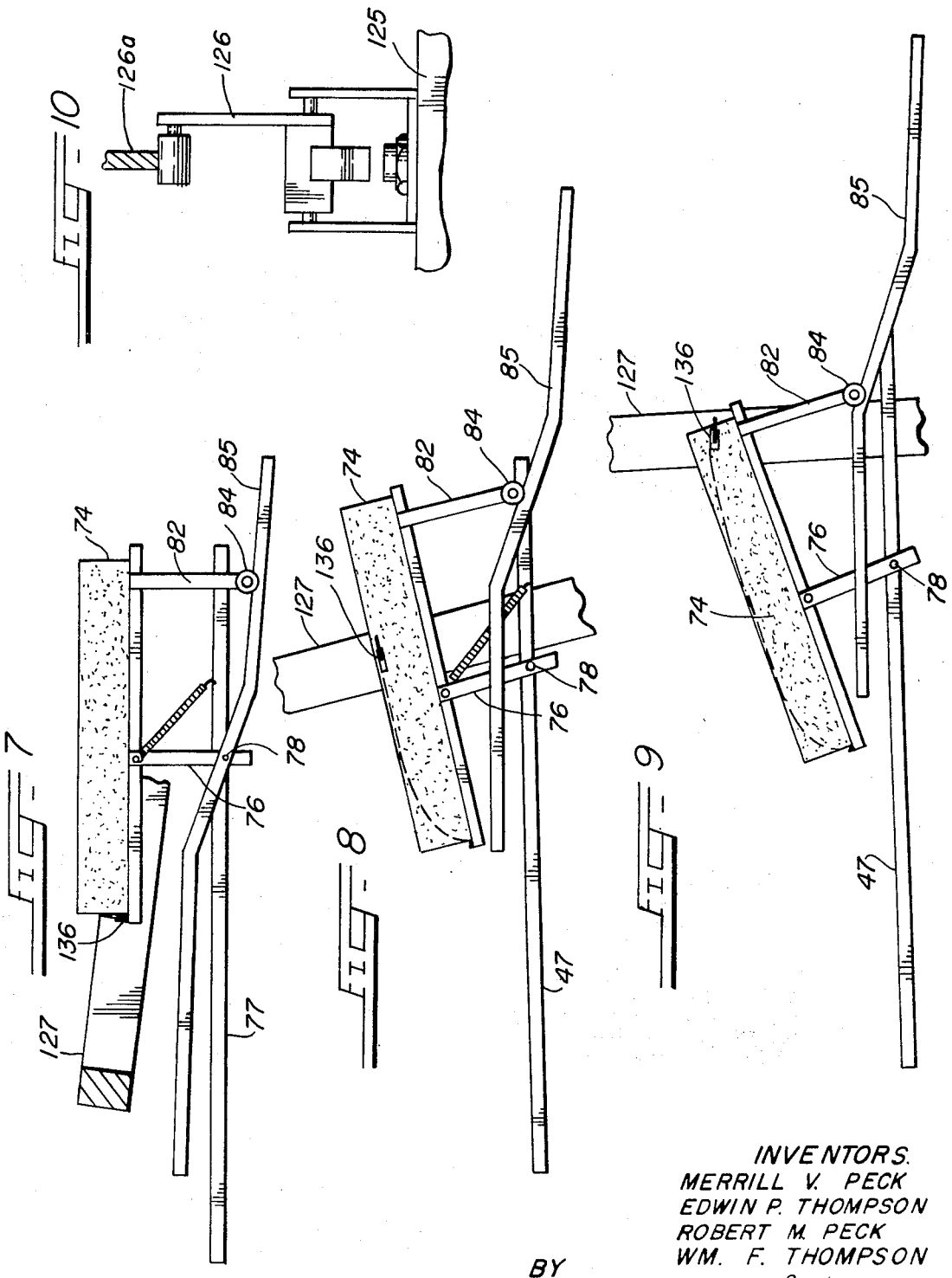

MACHINE FOR CUTTING CONTOUR

BACKGROUND OF THE INVENTION

This invention has been developed as a result of the problems encountered in cutting slabs of foamed resilient material to the desired contour for use as cushions. The planar cutting of this material has been made practical by equipment of the type disclosed in the U.S. Pat. Nos. 3,104,578 and 3,537,342.

The cutting of contour on a piece of material necessarily involves relative movement of the piece with respect to the cutting element, and usually also a movement of the cutting element itself to change its attitude with respect to work as the contour is generated. These principles are well established in the art of machine design. Machines based upon these principles differ primarily in the mechanism for inter-relating the movement (and changes in attitude) of the cutting element with the movement of the work piece to establish the predetermined contour.

SUMMARY OF THE INVENTION

The preferred form of the present invention is adapted to cut a sequence of single-curvature configurations to form a continuous top surface of a cushion. The frontal area of the cushion is defined by an arcuate surface starting from a vertical tangent and changing quickly to a substantially horizontal tangent, producing a section of an approximately cylindrical surface on a horizontal axis. The curvature then changes to a more gradually rounded upwardly convex configuration usually continuing to the rear of the cushion. A machine embodying the present invention will normally have a cutting element disposed to establish a cutting line generally parallel to the table on which the work is supported. This cutting element is mounted for limited angular movement about an axis of rotation which is also normally parallel with the surface of the work table. The rotation of the cutting element with respect to the work table takes place while the table is in a substantially fixed position with respect to the frame of the machine. This rotation generates the cylindrical surface at the front of the cushion referred to above, with the stationary table permitting the cutting element to begin its operation in a substantially vertical direction as it moves upwardly through the workpiece. As the rotation of the cutting element continues through approximately 90° to a position approaching a horizontal tangent, the movement of the table can begin. To a limited extent, simultaneous movement of the table and the cutting element can take place under suitable coordinating controls.

The generation of the top curvature of the cushion to the rear of the rounded front is produced by a shifting of the position of the work table while the movement of the cutting element with respect to the frame of the machine is substantially arrested. The shifting of the position of the work table is preferably in the nature of an angular displacement with respect to a carrier that moves laterally with respect to the frame in a direction to bring the work into engagement with the cutting element. The radius of the movement of the table is adjustable, and takes place on an axis preferably parallel to the axis of movement of the cutting element. The angular position of the work table about its pivot mounting is controlled by a sequence of linear cam elements, the positions of which are variable with respect to each other while still preserving a continuity of the entire cam assembly. The cam system is engaged by a cam follower associated with the table at a point remote from the axis of pivotal mounting on the table, with the result that the movement of the carrier along a guideway on the frame of the machine induces the limited rotation of the table about its pivot axis which generates the curvature of the top of the cushion as the carrier moves the work into engagement with the cutting element.

The machine preferably includes a sequence drive mechanism that insures a coordination between the movement of the carrier (which controls the orientation of the table) with the movement of the cutting element, so that the table movement will be limited to periods in which the cutting element is moving in a direction approaching parallelism with the motion of the carrier. The preferred form of this control system includes a detector responsive to the movement of the cutting element with respect to the frame, the detector being adapted to initiate and maintain the movement of the carrier on the attainment of a predetermined position by the cutting element.

DESCRIPTION OF THE DRAWINGS

FIG. 1 is a perspective elevation of a machine embodying the present invention.

FIG. 2 is a perspective elevation from the opposite side of the machine from that shown in FIG. 1.

FIG. 3 is a side elevation of the machine shown in FIGS. 1 and 2.

FIG. 4 is a side elevation of the opposite side of the machine from that shown in FIG. 3.

FIG. 5 is a view of the actuating mechanism for controlling the table height.

FIG. 6 is a section on a vertical plane transverse to the path and movement of the table, and illustrates the mechanism for supporting and positioning the carrier.

FIGS. 7–9 are schematic illustrations of the successive operating positions of the machine.

FIG. 10 is an end view on an enlarged scale of the portion of the machine adjacent the limit switch.

DESCRIPTION OF THE PREFERRED EMBODIMENT

The main frame of the machine illustrated in the drawings includes the transverse base members 20–22, the end members 23 and 24 interconnecting the members 20–22, the columns 25 and 26 secured, respectively, to the members 23 and 24, the diagonal braces 27 and 28, and the top beam 29 interconnecting the upper extremities of the columns 25 and 26. The main frame also includes the short members 30 and 31 interconnecting the base members 20 and 21, and providing for the support of the spaced pairs of guideway rails 32–33 and 34–35. A beam 36 extends between the members 30 and 31, and between the rails 32–33 and 34–35 to provide support for portions of the actuating mechanism of the machine.

A support frame is movable vertically with respect to the main frame, and includes the vertical legs 37 and 38 received, respectively, between the members 32–33 and 34–35 of the main frame. Retainer plates as shown at 39 and 40 in FIG. 1 are preferably incorporated on the opposite sides of each of the legs, and are secured to the legs to maintain a telescoping interengagement and prevent lateral displacement. A rectangular structure 41 (refer to FIG. 5) is secured to the upper extremities of the legs 37 and 38. The side rails 42 and 43 of the structure 41 function as rails for supporting the carriage 44 (refer to FIG. 6). This carriage is also a rectangular structure, and includes the end members 45 and 46 and the side members 47 and 48. Rollers shown at 49 and 50 in FIG. 6 are mounted on stub shafts 51 and 52 secured to the members 47 and 48, and brackets 53 and 54 are secured to the underside members 47 and 48 to provide a mounting for the stub shafts 55 and 56 carrying, respectively, the rollers 57 and 58 responsible for positioning the carriage laterally with respect to the frame structure.

The vertical placement of the support frame with respect to the main frame of the machine is controlled by the mechanism shown in FIG. 5. A beam 59 interconnects the lower extremities of the legs 37 and 38, and is provided with appropriate holes for receiving the screw jacks 60 and 61. Appropriate nut elements are secured to the underside of the beam 59, and are in engagement with the screw jack 60 and 61, respectively. The lower extremities of the screw jacks are supported by conventional bearing blocks secured to the beam 36. The sprockets 62 and 63 are respectively secured to the screw jack 60 and 61, and are inter-related by the drive chain 64, which also engages the idler sprocket 65 mounted on the stub shaft 66 secured to the beam 36. This idler, if desired, may be movable laterally with respect to the beam to control the slack in the chain 64. The bevel gear 67 is secured to the upper extremity of the screw jack 61, and is engaged by the bevel gear 68 mounted on the shaft 69. This shaft is supported by appropriate bearing blocks as shown at 70 in FIG. 5, secured to the diagonal beam 71 mounted on the member 34 of the main frame. A hand wheel 72 (refer to FIG. 1) controls the shaft 69, and consequently controls the vertical placement of the support frame with respect to the main frame.

A table 73 is mounted on the carriage 44 for supporting the block of foam shown at 74, which is a work piece of the type for which the illustrated machine is primarily adapted. A rail 75 at the leading edge of the table 73 functions as a limit stop to guide the operator in the placement of the block 74 on the table, so that the contour generated by the machine will have the correct relationship with original block material. Radius arms 76 and 77 are secured to the table, and extend to pivot pins as shown at 78 in FIGS. 8 and 9, which are mounted on the side members 47 and 48 of the carriage. Groups of holes as shown at 79 in FIG. 2 are provided in each of the radius arms for engagement with these pins to establish different radii of pivotal support of the table 73. Corresponding adjustment of the hand wheel 72 will permit the machine to produce a path of movement of selected curvature about a horizontal axis without altering the height of the top tangent to this path of movement.

A pair of tension springs 80 and 81 biases the table in a clockwise direction, as viewed in FIG. 2. The leg 82 is secured to the rear portion of the table (refer to FIG. 2), and is provided with the post 83 carrying the roller 84, which functions as a cam follower. The linear cam assembly 85 is fixed with respect to the support frame, and the engagement of the cam follower 84 controls the angular position of the table about its axis of pivot mounting.

Referring particularly to FIG. 4, the linear cam assembly 85 is an assembly of cam elements 86–90, pivotally interconnected by pins as shown at 91–93 to form a sequence defining a continuous cam surface. A beam 94 is normally fixed with respect to the leg 37 of the support frame, and provides support for the slotted members 95–97 extending to points of attachment with the cam elements 86–90. Bolts as shown at 98–100 secure the slotted members 95–97 to the beam 94 for vertical adjustment, and bolts as shown at 101 and 102 secure the upper extremities of the members 95–97 to the cam elements. The member 96 is secured coaxially with the pin 92. The adjustment of the positions of the cam elements is accomodated by slots as shown at 103 and 104. Once the adjustment has been made, the movement of the carriage will induce a rocking action of the table 73 about a selected horizontal axis of rotation as the work piece is brought into engagement with the cutting element. This movement will generate a predetermined curvature to the top of the workpiece 74. The placement of this curvature in the direction of movement of the carrier may be altered by shifting the entire cam system 85 as a unit. The beam 94 is provided with slots 105 and 106 for receiving the bolts 107 and 108 securing the beam 94 to the bar 109 carried by the bracket structure 110 secured to the side member 42 of the support frame. The cam assembly 85 and the beam 94 constitute a sub-assembly that can be shifted bodily to control the placement of the curvature established by the rocking table movement.

The mechanism responsible for inducing the motion of the carrier along the rails 42 and 43 is best shown in FIGS. 2 and 4. The horizontal beam 111 is secured to the vertical members 32 and 33 of the main frame, and provides support for the shafts 112 and 113 carrying the sprockets 114 and 115, respectively, engaging the chain 116. This chain has a pin 117 projecting laterally and engaging the slot 118 in the depending arm 119 secured to the carriage. Movement of the chain is thus imparted to the carriage, as the shaft 112 is rotated by the sprocket 122 of the motor unit 123. This unit is supported by a bracket 124 carried by the base members 21 and 22 of the main frame. The vertical extension of the slot 118 in the arm 119 permits the device to operate in either of two ways. The slot accomodates the vertical movement of the support frame controlled by the hand wheel 72, and additionally permits the pin 117 to move in a continuous path along the upper and lower courses of the chain 116, if that is desirable. Alternatively, the action of the motor unit 123 may be controlled in opposite directions, with the pin 117 confined to the upper course of the chain 116, and the limits of movement determined by switches as shown at 125 actuated by the arm 126. Where the pin 117 follows the full circuit of the chain 116, this switch can be used to indicate the completion of a cycle of operation. The arm 126 is engaged by the member 126a secured to the arm 119. The position of the arm 119 may be adjusted with respect to the carrier, as the arm is mounted on the block 119a engaging a guideway (not shown) on the carrier. Manipulation of the threaded rod 119b rotatably mounted in the block 119c on the carrier will alter the placement of the arm 119, and consequently alter the placement of the limit position of the carrier with respect to the frame.

The cutting action of the machine is generated by the band knife assembly contained within the housing 127. Blocks 128 on opposite sides of the machine inwardly of the columns 25 and 26 are provided with pivot pins engaging the bearings 129 and 130 mounted, respectively, on the columns 25 and 26. Spaced bars as shown at 131 and 132 are secured to the saw assembly, and bear against opposite sides of the blocks 128 to establish a guideway relationship permitting movement of the entire saw assembly toward and away from the axis of rotation established by the bearings 129 and 130. A hand wheel 133 mounted on a shaft supported in bearings secured to the housing 127 controls the screw jacks 134 and 135 through conventional bevel gears, and these screw jacks engage the blocks 128. Rotation of the hand wheel 133 will therefore induce movement of the entire cutting assembly toward and away from the axis of rotation established by the bearings 129 and 130.

The cutting mechanism within the frame-housing 127 is similar in general appearance to a band saw. The structural details of this mechanism, per se, form no part of the present invention. This type of mechanism, however, is ideally suited to the cutting of the type of material for which the machine illustrated in the drawings is adapted. Wheels are usually mounted at the opposite sections of the housing indicated at 127a and 127b in FIG. 1, and an endless band knife extends around the wheels. One run of this knife extends through the housing section 127c, and the other run of the band has its cutting edge exposed for engagement with the work piece. The preferred form of the cutting mechanism includes a thin shield structure surrounding all of the band knife with the exception of a small portion immediately adjacent the cutting edge. This edge is preferably scalloped slightly for the best cutting action. The cutting course of the band knife, together with its shield structure, is indicated at 136 in FIG. 1. Other forms of conventional cutting devices could conceivably be used with particular workpiece materials.

The movement of the cutting mechanism about the axis of the bearings 129 and 130 is generated by the mechanism best shown in FIG. 3. To reduce the forces required for this movement, an arm assembly 137 extends from the block 128, and the counterbalance weight 138 is secured to this arm. If desired, the arm assembly 137 can include telescoping members to provide a degree of radial adjustability of the position of the weight 138 with respect to the axis of the bearings 129 and 130.

The angular movement of the cutting element is powered by the motor 139 mounted on the main frame of the machine. Power is delivered through the chain 140 (refer to FIG. 1) to the worm drive unit 141, and the output of this unit is delivered via the sprocket 142 and the chain 143 to the sprocket 144 secured to the shaft 145. This shaft is mounted in bearing blocks as indicated at 146 in FIG. 3, which are secured directly to the column 26 and the adjacent vertical frame member 147. Rotation of the shaft 145 is imparted to the plate 148 carrying the pin 149 serving as a connection point for the link 150. This link is pivotally connected to the rack bar 151, which has a line of movement determined by the guide block 152 mounted on the bracket 153, and by the second guide block 154 carrying rollers 155 and 156 supported by the bracket 157. The brackets 153 and 157 are preferably secured directly to the column 26. The reciprocating movement induced by the rotation of the plate 148 causes the rack element 158 to rotate the gear 159 secured to the stub shaft 160 forming the pivot journal for the cutting mechanism.

An actuator 161 is secured to the bar 151 to cooperate with the switch 162 to provide a signal indicating the appropriate rotated position of the cutting mechanism such that the movement of the table carrier can begin. The actuation of a starting switch by an operator will normally first energize the motor 139, thus beginning the rotation of the cutting mechanism from the position shown in FIG. 2, to an upright position shown schematically in FIG. 9. At some predetermined point in the rotation of the cutting element, the closure of the switch 162 can begin the movement of the carrier. This sequence of actions will generate a contour as shown in these schematic illustrations of FIGS. 7, 8, and 9, which is produced by the interaction of the movement of the cutting member about the bearings 129 and 130, and the rotation of the table under the control of the linear cam 85.

FIG. 1 illustrates a hold-down mechanism that may be incorporated as an optional feature in the machine. A bar or roller 163 is mounted on the radius arms 164 and 165 extending from the shaft 166. This shaft is supported by the bearing blocks 167 and 168 carried by the top horizontal member 29 of the frame. A radius arm 169 is secured to this shaft, and controlled by the link rod 170. The opposite extremity of this link is connected to a second link 171 pivotally connected to a crank arm on the shaft 145 to produce a lost motion connection resulting in lowering of the bar 163 at the initiation of the angular movement of the cutting member.

An array of conventional switches and junction boxes is preferably mounted on the main frame of the machine as shown at 172–177. A manually actuated switch is also preferably incorporated at the work station, which may be considered as in front of the machine as shown in FIG. 1. This switch is not shown in the drawings, and may be placed to suit the convenience of the installation and the operator.

I claim:

1. A machine for cutting contour on a workpiece, said machine including a frame, a table having a supporting surface, a cutting element having a cutting edge spaced from said table, said table and cutting element being mounted on said frame for relative movement in a direction normal to said cutting edge, said machine also including drive means for said cutting element and for inducing said relative movement, wherein the improvement comprises:

means forming a pivotal mounting for said cutting element on said frame on an axis of rotation substantially parallel to the surface of said table;

a carrier mounted on said frame for movement in a direction normal to said cutting edge, said table being pivotally mounted on said carrier for angular movement about an axis parallel to said cutting edge; and positioning means controlling the attitude of said table about the pivot axis thereof with respect to said frame as a function of the position of said carrier with respect to said frame.

2. A machine as defined in claim 1, wherein said table is supported by radius arm means pivotally connected to said carrier, said radius arm means being engageable with said carrier and table to provide for the support of said table at a plurality of radial distances with respect to the axis of pivotal mounting thereof, said carrier being adjustable with respect to said cutting element in a direction toward and away from the axis of rotation of said cutting element.

3. A machine as defined in claim 1, wherein said drive means includes sequence control means interrelating the movement of said cutting element about the axis of pivotal mounting thereof, and the movement of said carrier.

4. A machine as defined in claim 1, wherein said positioning means includes a cam member mounted on said frame, and a cam follower normally engaging said cam and mounted on said table at a position spaced from the axis of pivotal mounting of said table.

5. A machine as defined in claim 4, wherein said cam member is a linear sequence of bar elements adjustable with respect to said frame, and to each other.

6. A machine for cutting contour on a workpiece, said machine including a frame, a table having a supporting surface, a cutting element having a cutting edge spaced from said table, said table and cutting element being mounted on said frame for relative movement in a direction normal to said cutting edge, said machine also including drive means for said cutting element and for inducing said relative movement, wherein the improvement comprises:

a carrier mounted on said frame for movement in a direction normal to said cutting edge, said table being pivotally mounted on said carrier for angular movement about an axis parallel to said cutting edge; and positioning means controlling the attitude of said table about the pivot axis thereof with respect to said frame as a function of the position of said carrier with respect to said frame.

7. A machine as defined in claim 6, wherein said table is supported by radius arm means pivotally connected to said carrier, said radius arm means being engageable with said carrier and table to provide for the support of said table at a plurality of radial distances with respect to the axis of pivotal mounting thereof, said carrier being adjustable with respect to said cutting element in a direction toward and away from the axis of rotation of said cutting element.

8. A machine as defined in claim 6, wherein said positioning means includes a cam member mounted on said frame, and a cam follower normally engaging said cam and mounted on said table at a position spaced from the axis of pivotal mounting of said table.

9. A machine as defined in claim 6, wherein said cam member is a linear sequence of bar elements adjustable with respect to said frame, and to each other.

* * * * *